(12) United States Patent
Pipher

(10) Patent No.: US 11,165,972 B2
(45) Date of Patent: Nov. 2, 2021

(54) MULTI-CAMERA VIRTUAL STUDIO PRODUCTION PROCESS

(71) Applicant: Tim Pipher, Burbank, CA (US)

(72) Inventor: Tim Pipher, Burbank, CA (US)

( * ) Notice: Subject to any disclaimer, the term of this patent is extended or adjusted under 35 U.S.C. 154(b) by 0 days.

(21) Appl. No.: 16/155,373

(22) Filed: Oct. 9, 2018

(65) Prior Publication Data

US 2019/0110004 A1    Apr. 11, 2019

Related U.S. Application Data

(60) Provisional application No. 62/569,844, filed on Oct. 9, 2017.

(51) Int. Cl.

| | |
|---|---|
| *H04N 5/272* | (2006.01) |
| *H04N 5/247* | (2006.01) |
| *H04N 21/2187* | (2011.01) |
| *H04N 5/262* | (2006.01) |
| *G11B 27/02* | (2006.01) |
| *H04N 5/222* | (2006.01) |
| *H04N 21/218* | (2011.01) |

(52) U.S. Cl.
CPC ............. *H04N 5/272* (2013.01); *G11B 27/02* (2013.01); *H04N 5/2224* (2013.01); *H04N 5/247* (2013.01); *H04N 5/2628* (2013.01); *H04N 21/2187* (2013.01); *H04N 21/21805* (2013.01)

(58) Field of Classification Search
CPC ...... H04N 5/272; H04N 5/2224; H04N 5/247; H04N 5/2628; H04N 21/2187; G11B 27/02
See application file for complete search history.

(56) References Cited

U.S. PATENT DOCUMENTS

| | | | |
|---|---|---|---|
| 6,476,874 B1 * | 11/2002 | Ito ........................... | H04N 5/222 348/584 |
| 6,522,787 B1 * | 2/2003 | Kumar .................... | G06T 15/10 348/E5.022 |

OTHER PUBLICATIONS

Publication of KR101373631B1, Mar. 12, 2014 (Year: 2014).*
Translation of Publication of KR101373631B1, Mar. 12, 2014 (Year: 2014).*

* cited by examiner

*Primary Examiner* — Nicholas G Giles
(74) *Attorney, Agent, or Firm* — Gary L. Eastman, Esq.; Eastman IP

(57) ABSTRACT

A production process involves predetermined number of cameras simultaneously filming a background at predetermined angles, and filming actors in a studio with the same number of cameras and the same angles, used in conjunction with a virtual studio system. In studio, the actors perform before a green screen and the virtual studio system composites the actors onto the background in real-time. Camera tracking allows the in-studio cameras to pan, tilt, focus, zoom, and make limited other movements as the virtual studio system adjusts display of the background in a corresponding manner, resulting in a realistic scene without transporting actors and crew to the background location.

7 Claims, 5 Drawing Sheets

MULTI-CAMERA VIRTUAL STUDIO PRODUCTION PROCESS

RELATED APPLICATIONS

This application claims priority to the U.S. Provisional Patent Application Ser. No. 62/569,844 entitled "Multi-Camera Virtual Studio Production Process," filed Oct. 9, 2017, and which is fully incorporated herein by reference.

FIELD OF THE INVENTION

The present invention pertains generally to a process for filming and video production with multi-camera virtual studio systems. More specifically, the present invention pertains to a process of filming on location with multiple cameras, filming the actors in studio with multiple cameras, and combining the on-location and in-studio video to create a single scene. The present invention is particularly, but not exclusively, useful as a method for producing realistic scenes without transporting actors and crew to locations outside of the studio.

BACKGROUND

Chroma keying is a common technique in filming which allows actors and objects to be placed against a separately prepared background. The process involves filming the actors and objects in front of a specific color, and, in post-production, replacing the color with the desired background. The process is popularly known as "green screen" due to the frequent use of green as the chroma key color, although blue is also commonly used.

Problems with background consistency occasionally arise when using traditional chroma keying techniques, especially when a scene is filmed at multiple angles. One common issue is that a person or object in the background might disappear or be in an unexpected place when the camera angle is switched.

Background consistency problems can be partially avoided by filming actors on location rather than using chroma keying to change the background. One disadvantage of filming actors on location is the expense, time, and logistical considerations involved in transporting actors and crew to the actual locations of the film's setting. Moreover, background inconsistencies arise even in on-site filming if multiple shots, taken at different times or on different days, are tied together in a single scene.

In light of the above, it would be advantageous to provide a method of providing a consistent background in filmed scenes.

It would be further advantageous to provide a method of filming actors in a studio separate from a scene's background, while providing consistency in the scene's background

SUMMARY OF THE INVENTION

The present invention provides a process for use in conjunction with multi-camera virtual studio systems, which greatly enhances the realism of film, video, and TV productions shot on green screen stages. As used herein, "green screen" is contemplated to include, in addition to green backgrounds, blue backgrounds or backgrounds of any other color desirable under the circumstances, for use with chroma keying techniques.

Actors can be filmed from the comfort of the green screen stage, but appear, with tremendous realism, to be performing in any location the producer wishes, including locations that normally would be expensive or difficult to film in. As a non-limiting example, the actors may appear to be performing in retail stores, offices, golf courses, restaurants, mansions, on the beach, or in any other location. The result includes significantly lowered expenses since actors and crew do not need to be transported to actual locations.

The process comprises filming, simultaneously with multiple cameras, backgrounds in actual locations that the producer would like re-created in the studio. These shots are called "background plates" or simply "plates." These plates are shot with multiple cameras, all recording at once, at multiple angles. Importantly, the angles are the same angles that the cameras will be at in studio. The quantity of cameras recording the plates is the same quantity as the cameras that will be filming in the studio. For example, if the producer will be filming with a three camera set-up in the studio, the background plates should be shot using three cameras recording simultaneously in the field, in the same configuration, including the same angles as the studio cameras will be filming in-studio. If the producer will be filming with four cameras in-studio, there should be four cameras filming the background plates. If two cameras will be filming in the studio, there should be two background plate cameras. In general, if any other number of cameras will be filming in the studio, there should be that same number of cameras filming the background plates.

By filming with this process, if a person in the background plate—effectively an "extra"—is walking across the background, and during the studio production a camera is switched to pick up a different angle, that background person will be picked up by the switched-to camera in the correct place and at the correct angle as he would be if he were actually in the studio with the foreground actors on stage. Without this technique, using traditional green screen methods, when the camera switches, that background actor would either disappear, or there would be somebody or something else in the spot he should be, which would ruin the realism. The same is true of cars, birds, bicycles, and everything else that would or could be making its way across the background as cameras switch.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein.

DETAILED DESCRIPTION

Figure 1:
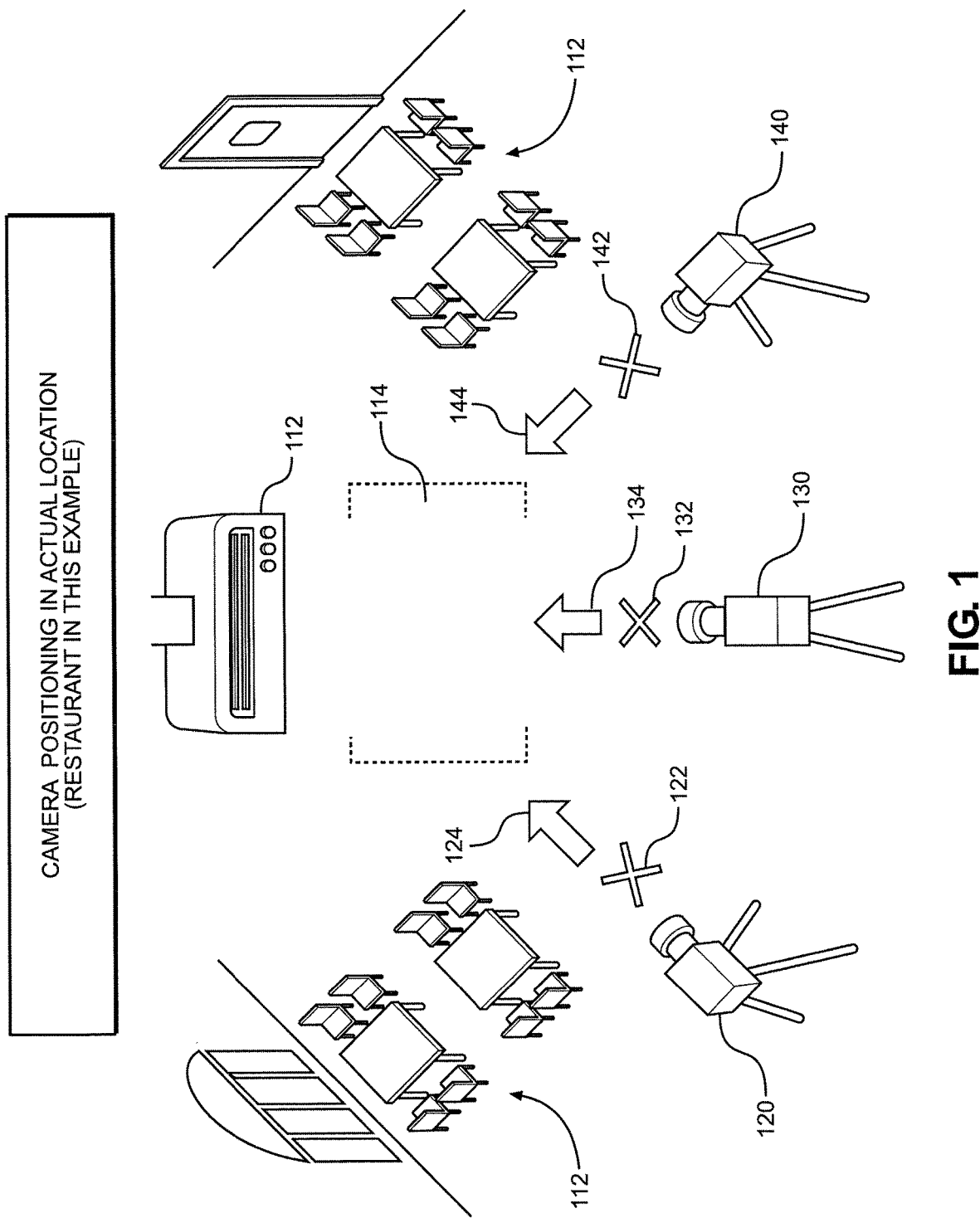
FIG. 1 is a diagram of camera positioning for filming a background in an actual location.

Referring initially to FIG. 1, the positioning of cameras at a background location is shown. The background location may be at any desired location, but is shown here as a background for a scene that takes place in a restaurant. As shown in FIG. 1, background elements 112 are present in the forms in which they appear in the location, including windows, tables, and a pizza oven in the present example. An empty space 114 may be prepared in some circumstances where the principal part of the foreground action will take place. For example, in a restaurant, an empty space may be created by moving away tables and chairs.

Three cameras are depicted in FIG. 1, although any number of cameras may be used, depending on the particular needs of the scene. More particularly, setups with two to four cameras are most common for TV productions, and the present invention works particularly well with such setups. Nonetheless, some films have used several dozen cameras for special purposes or effects, such as "bullet time." The present invention also works well with setups involving large numbers of cameras, and can avoid the labor, cost, and other drawbacks involved in using computer-generated backgrounds.

As seen in FIG. 1, a left camera 120 is placed at a left camera position 122 and a left camera angle 124, while a middle camera 130 is placed at a middle camera position 132 and a middle camera angle 134, and a right camera 140 is placed at a right camera position 142 and a right camera angle 144. The left camera 120, middle camera 130, and right camera 140 all film at the same time, for at least the duration of time the corresponding scene is expected to last.

Figure 2:
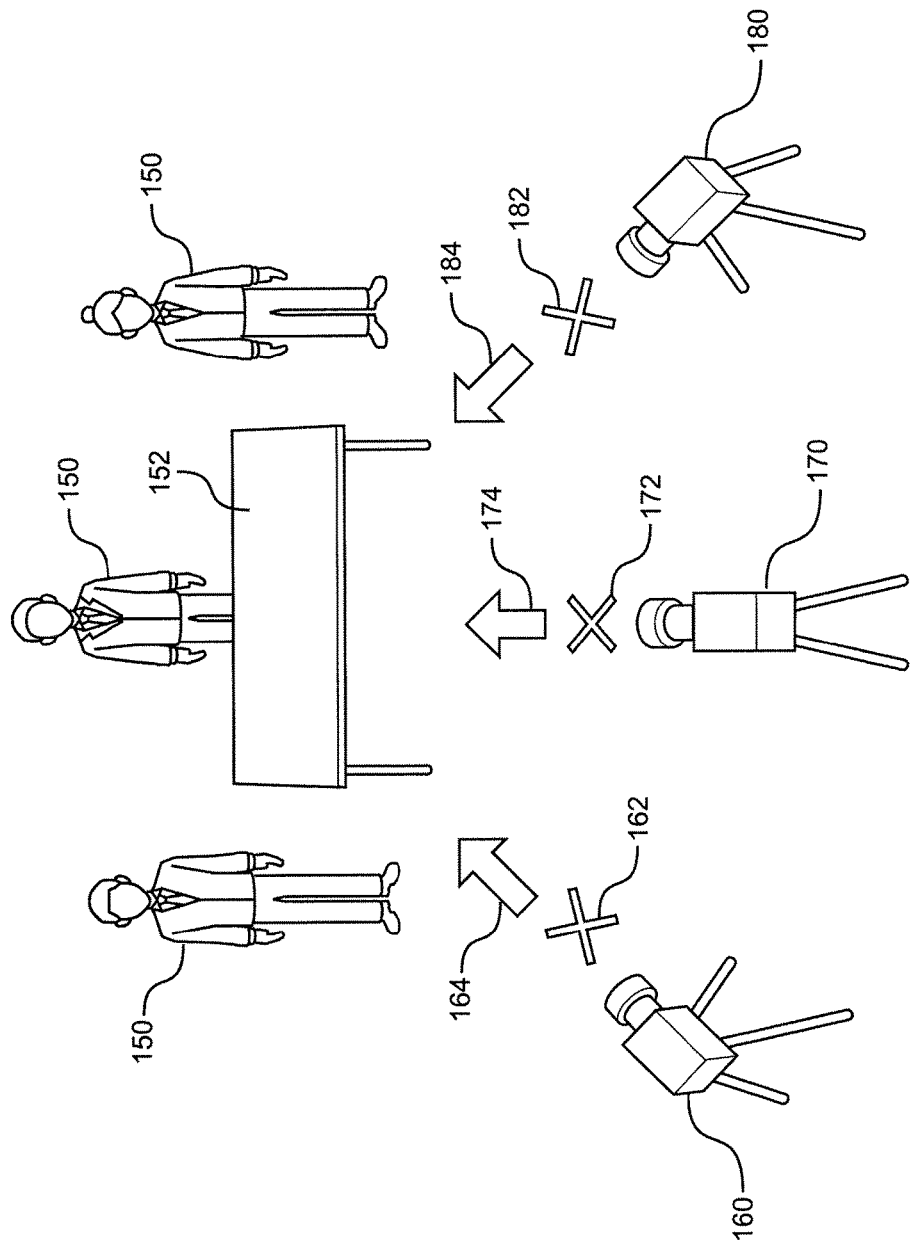
FIG. 2 is a diagram of camera positioning for filming actors and foreground objects in studio.

Referring now to FIG. 2, in the studio actors 150 and props 152 are located in front of a green screen (not depicted). A left camera 160 is located at a left camera position 162 and a left camera angle 164, while a middle camera 170 is located at a middle camera position 172 and a middle camera angle 174, and a right camera 180 is located at a right camera position 182 and a right camera angle 184. The relative positions of left, middle, and right camera positions 162, 172, and 182 in the studio are the same as the relative positions of left, middle, and right camera positions 122, 132, and 142 on location. The angles 164, 174, and 184, are the same, relative to each other, as the angles 124, 134, and 144. In this way, foreground elements from a studio camera at a particular point in time can be placed against the background from a background location camera of the corresponding position, angle, and time, resulting in temporal and spatial consistency in the scene.

Filming takes place onstage in conjunction with a virtual studio system, such as those sold in conjunction with the marks ORAD, BRAINSTORM, or VIZRT, with camera tracking. Camera tracking is a system through which data flows from the cameras to the virtual studio system in such a way that the virtual background will automatically move around to correspond with in-studio camera movement. The studio cameras are free to pan, tilt, zoom, focus, and make a certain amount of other movement. These in-studio camera movements don't need to match movement in the on-location plates. In fact, the on-location filming is conducted with "locked down" non-moving cameras. This gives the filmmaker the freedom to make the camera moves that the story requires in-studio, allowing for artistic freedom and further enhancing the impression of reality.

Figure 3:
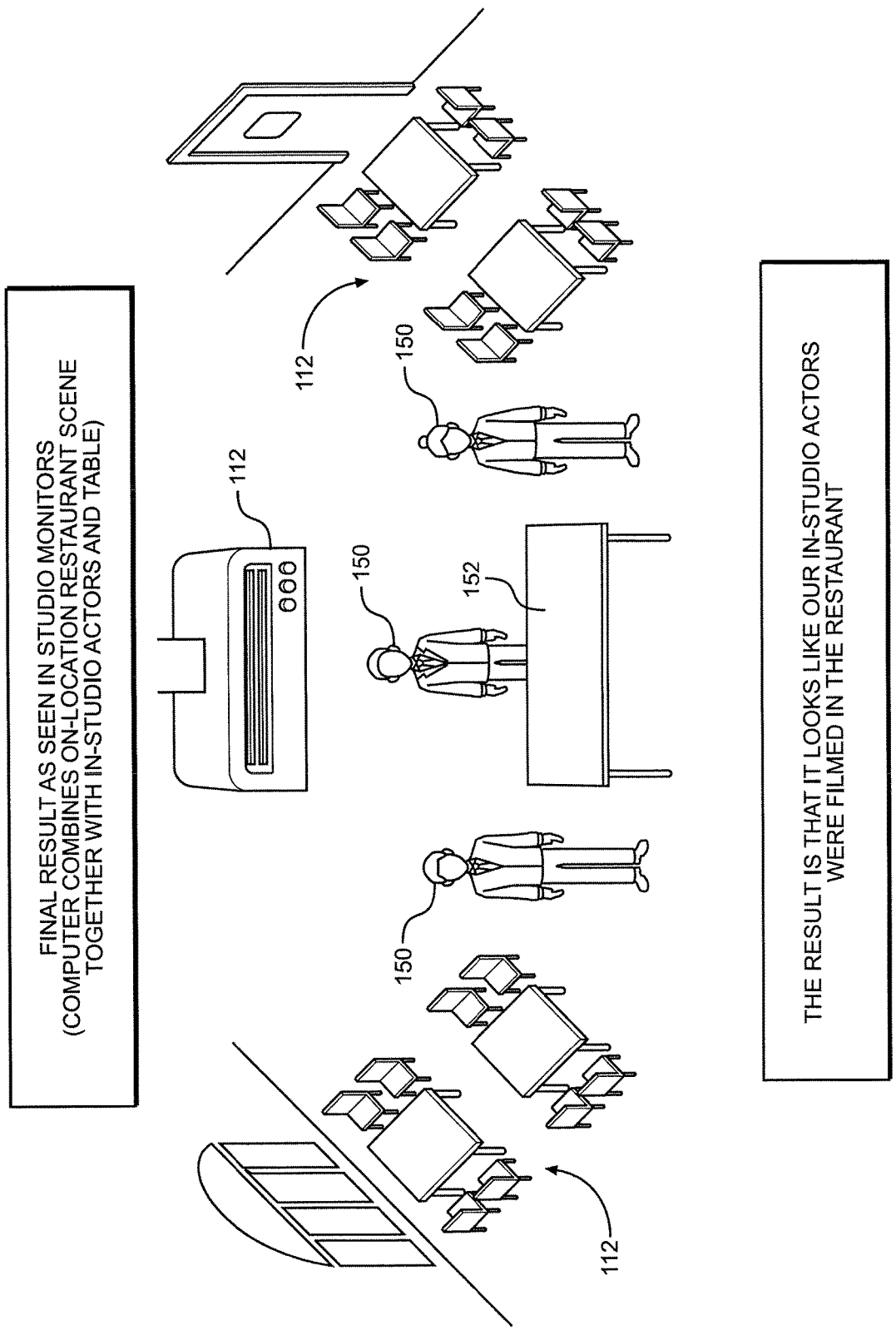
FIG. 3 is a diagram the combination of the background and foreground as each would appear to be positioned when seen in studio monitors.

Referring now to FIG. 3, the result of the process is depicted. The actors 150 and props 152 appear to be acting in the location filmed by the background cameras. As the view is switched between camera angles, background elements, including transitory elements such as people or animals, appear consistently in the expected places, resulting in a realistic, "three-dimensional" depiction of the scene.

This result may be seen in real-time on studio monitors and recorded as the actors are performing. By depicting and recording it in real-time, a director can determine immediately if the scene is satisfactory, or a "live" TV show can be broadcast. The on-location plates (the background) and in-studio live action (the foreground) are composited, or combined, live, saving the expense of post-production compositing and allowing for in-studio camera movement.

More generally, the result may be prepared by a computer and depicted in real-time on studio monitors as the actors are performing, or it may be prepared in post-processing, or both. By depicting it in real-time, a director can determine immediately if the scene is satisfactory, or a "live" TV show can be broadcast. Performing or re-performing the combination during post-processing allows film editors to fine tune the effect and add or adjust any element as desired. If the foreground and background are combined in post-production, the order of filming isn't limited to doing the background first. The background and foreground elements could be filmed in any order, although one advantage of filming the background first is the ability to preview the resultant combination in real-time in the studio.

Thus, in a preferred embodiment, tracking data is used for real-time compositing, and in an alternative embodiment, tracking data is stored for compositing the in-studio actors with the backgrounds later, during post production. In some embodiments, the background and foreground are composited live on studio monitors, and the tracking data is stored and the final combination of the foreground with the background plates is performed later, during post production. In situations in which computational power may be limited, this allows the use of a more efficient compositing algorithm in real-time on the studio monitors and a higher quality compositing algorithm, or even manual intervention in the compositing process, at a later time.

Figure 4:
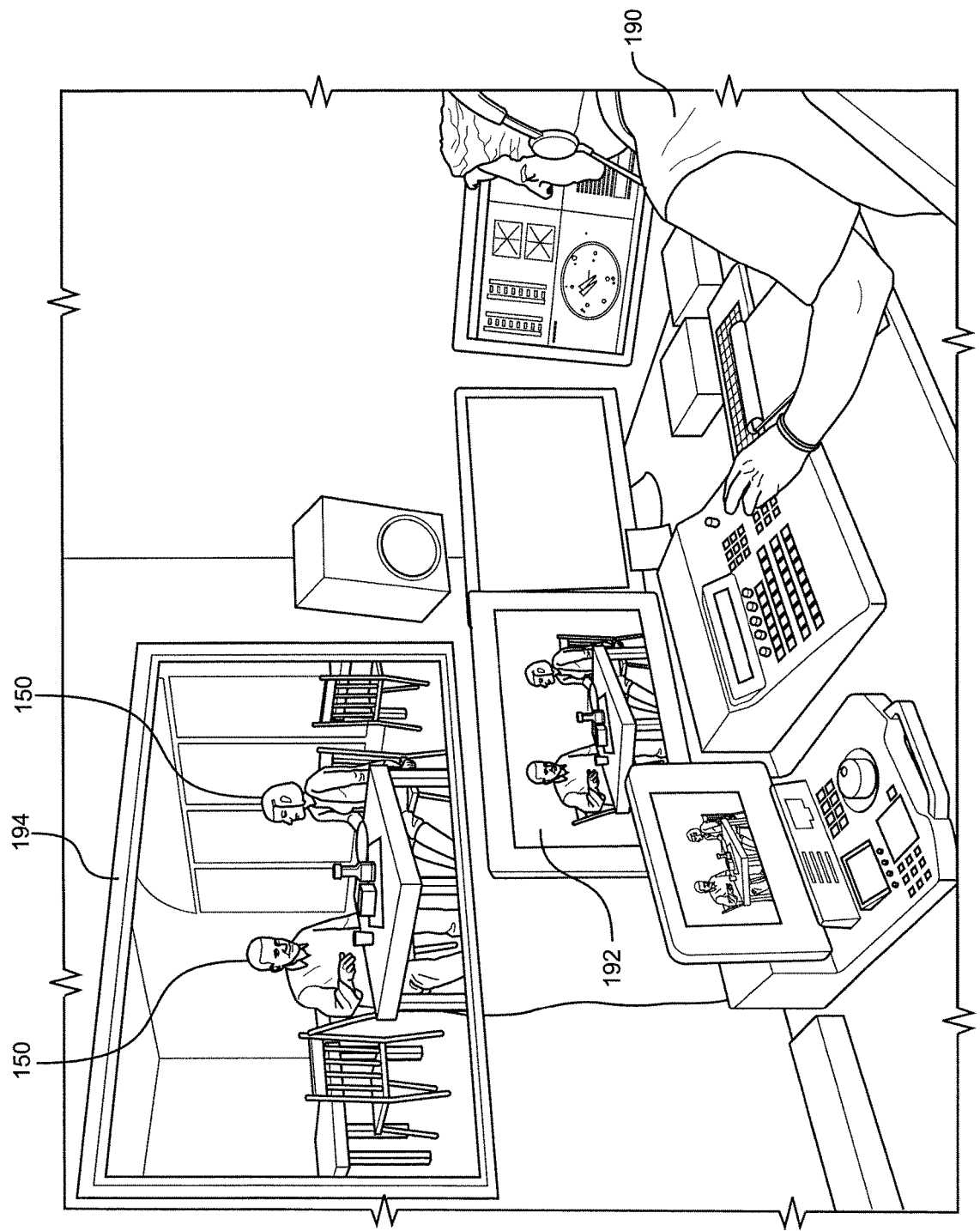
FIG. 4 is a depiction of the foreground of a scene displayed on the console of a studio technician while the foreground is composited on the background in real-time on a studio monitor.

Referring now to FIG. 4, a production control room is shown, in which a technician 190, such as a technical director, is shown at a workstation. The technician 190 sees the foreground, with the actors 150 and props 152 against the green screen background on a workstation monitor 192. Another studio monitor 194 displays, at the same time, the scene including the foreground composited onto the virtual background. Before in-studio filming, each of the in-studio cameras is associated with a background plate in the virtual studio system. Then, during filming, the virtual studio system composites the foreground captured by each in-studio camera onto the corresponding virtual background, using camera tracking to adjust the virtual background in correlation with the panning, tilting, zooming, focusing, and movement of the in-studio cameras.

Figure 5:
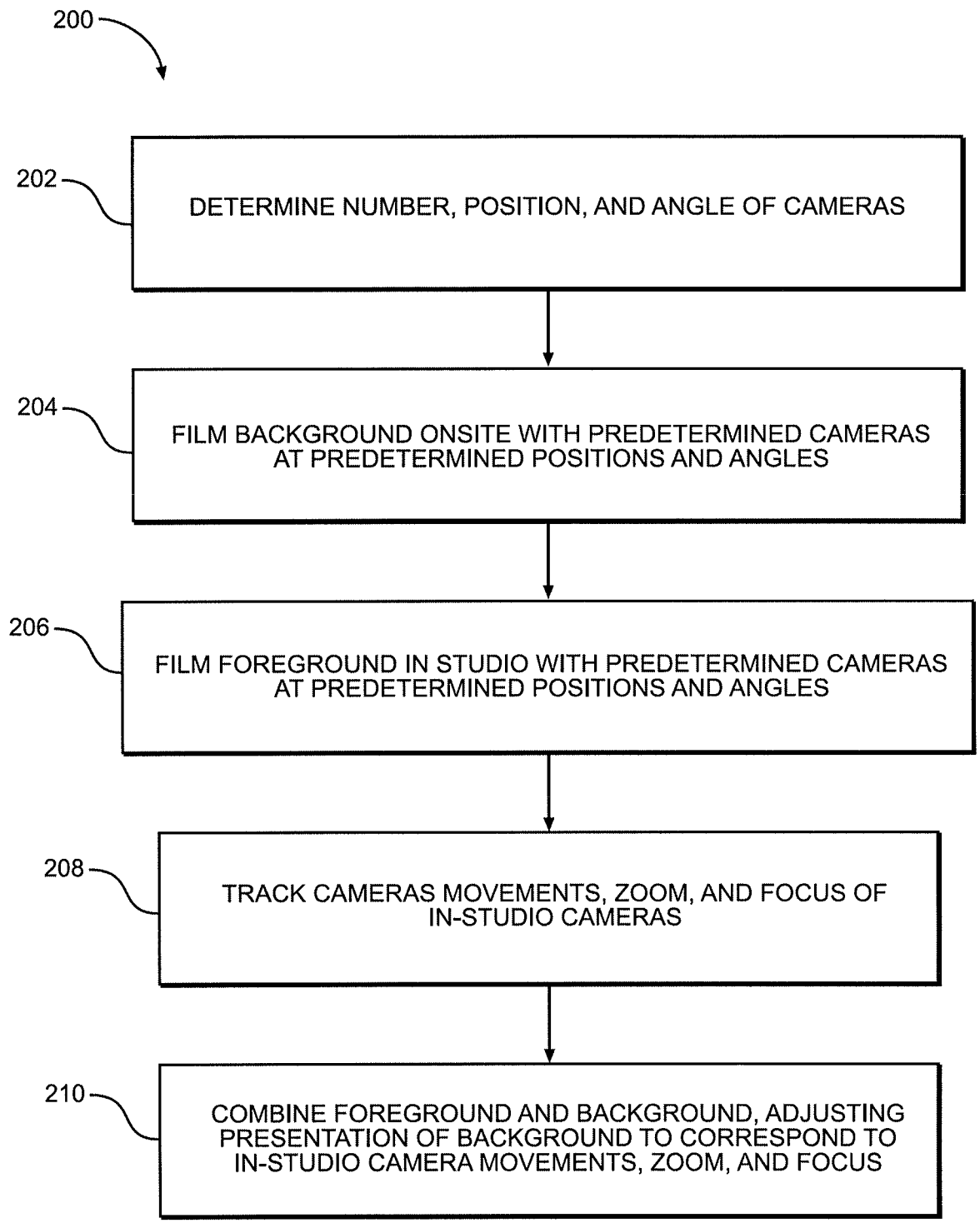
FIG. 5 is a diagram of the basic steps involved in the method of the present invention.

Referring now to FIG. 5, an outline of the primary steps in the process of the present invention is diagrammed and generally designated 200. A first step 202 involves providing a predetermined number of cameras, as well as a predetermined position and angle for each camera. A second step 204 involves filming the background on location with the predetermined number of cameras at the predetermined positions and angles. A third step 206 involves filming the foreground in the studio and in front of a green screen. The third step 206 also uses the same predetermined number of cameras at the same predetermined positions and angles. During in-studio filming, a fourth step 208 comprises camera tracking, also known as match moving. In this step, in-studio camera movements, including zooming, panning, tilting, and focus, are provided to the virtual studio system. A fifth step 210, which, as discussed above, may occur simultaneously with the third step 206 and the fourth step

208 using computer technology, involves compositing, or placing the foreground elements on the background plates. The in-studio camera movement data provided by the fourth step 208 allows the virtual studio system to adjust the display of the background—e.g., making it bigger, panning to a different part of the background image, etc.—in order to make the in-studio camera movement appear to affect both foreground and background elements. This compositing, including camera tracking and corresponding background adjustments, can be performed in real-time and appear on in-studio monitors during filming and, if desired, even be broadcast live.

While there have been shown what are presently considered to be preferred embodiments of the present invention, it will be apparent to those skilled in the art that various changes and modifications can be made herein without departing from the scope and spirit of the invention.

What is claimed is:

1. A method for realistic offsite filming, consisting essentially of the steps of:

determining a number of cameras with corresponding positions and angles;

filming a background with the determined number of cameras at the determined positions and angles;

filming a foreground with the determined number of cameras at the determined positions and angles;

tracking camera movements, zoom, and focus of each of the cameras during the step of filming a foreground; and combining the foreground and background, adjusting the presentation of the background to correspond to the tracked movements, zoom, and focus.

2. The method for realistic filming as recited in claim 1, wherein the step of combining the foreground and background is performed at the same time as the step of filming a foreground.

3. The method for realistic filming as recited in claim 2, further comprising the step of displaying the combined foreground and background in real-time on studio monitors during the step of filming the foreground.

4. The method for realistic filming as recited in claim 3, further comprising the step of broadcasting the combined foreground and background live during the step of filming the foreground.

5. The method for realistic filming as recited in claim 1, wherein the step of filming a background is performed prior to the step of filming a foreground.

6. The method for realistic filming as recited in claim 1, wherein the steps of filming a background and filming a foreground are performed at the same time.

7. The method for realistic filming as recited in claim 1, wherein the step of tracking camera movements, zoom, and focus is performed by a virtual studio system.

* * * * *